United States Patent
Baba

(10) Patent No.: US 8,944,946 B2
(45) Date of Patent: Feb. 3, 2015

(54) CONTINUOUSLY VARIABLE TRANSMISSION BELT AND CONTINUOUSLY VARIABLE TRANSMISSION

(75) Inventor: Shinichi Baba, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 989 days.

(21) Appl. No.: 12/516,607

(22) PCT Filed: Dec. 12, 2007

(86) PCT No.: PCT/IB2007/003872
§ 371 (c)(1), (2), (4) Date: May 28, 2009

(87) PCT Pub. No.: WO2008/072069
PCT Pub. Date: Jun. 19, 2008

(65) Prior Publication Data
US 2010/0069184 A1  Mar. 18, 2010

(30) Foreign Application Priority Data
Dec. 13, 2006 (JP) .................. 2006-336050

(51) Int. Cl.
F16H 57/04 (2010.01)
F16G 1/21 (2006.01)
F16G 1/22 (2006.01)
F16G 5/16 (2006.01)
F16G 1/00 (2006.01)
F16G 5/00 (2006.01)
F16H 9/18 (2006.01)

(52) U.S. Cl.
CPC  *F16G 5/16* (2013.01); *F16G 5/163* (2013.01); *F16H 57/0489* (2013.01); *F16H 9/18* (2013.01)
USPC .............................. 474/91; 474/242; 474/201

(58) Field of Classification Search
CPC ............. F16G 5/16; F16G 5/163; F16G 9/16; F16G 9/24
USPC .......................... 474/8, 91, 201, 242
See application file for complete search history.

(56) References Cited

U.S. PATENT DOCUMENTS 4,332,575 A * 6/1982 Hendriks ................. 474/201
6,090,004 A * 7/2000 Kanehara et al. ........ 474/242

(Continued)

FOREIGN PATENT DOCUMENTS

| | | |
|---|---|---|
| DE | 103 57 849 | 7/2005 |
| EP | 0 014 014 | 8/1980 |
| EP | 1 184 591 | 3/2002 |
| EP | 1 371 876 | 12/2003 |
| JP | 59-17350 | 2/1984 |
| JP | 2 22254 | 5/1990 |
| JP | 3 113145 | 5/1991 |
| JP | 5 272594 | 10/1993 |
| JP | 10 141459 | 5/1998 |
| JP | 2003 240060 | 8/2003 |
| JP | 2003 269547 | 9/2003 |

*Primary Examiner* — Henry Liu
(74) *Attorney, Agent, or Firm* — Oblon, Spivak, McClelland, Maier & Neustadt, L.L.P.

(57) ABSTRACT

A continuously variable transmission belt includes rings each superimposing annular component pieces on each other's inner and outer peripheries, and plural elements attached to the rings side by side in a circumferential direction. Each element includes a neck portion. The rings are disposed on opposite sides of the neck portion. The elements contact a driving pulley and a driven pulley. A lubrication oil discharge mechanism discharges out a lubrication oil in at least one of a gap between the component pieces, and a gap between each ring and the elements. A function of discharging the lubrication oil present in a region remote from the neck portion is higher than a function of discharging the lubrication oil present in a region near the neck portion. Thereby, the rings to which the elements are attached or the component pieces of the rings restrain decline in the centering characteristic in the width direction.

1 Claim, 11 Drawing Sheets

(56) References Cited

U.S. PATENT DOCUMENTS

| | | | |
|---|---|---|---|
| 6,629,904 B2 * | 10/2003 | Fujioka et al. | 474/242 |
| 6,945,890 B2 * | 9/2005 | Brandsma et al. | 474/242 |
| 6,997,836 B2 * | 2/2006 | Kanehara et al. | 474/242 |
| 2002/0137586 A1 | 9/2002 | Fujioka et al. | |
| 2004/0067808 A1 | 4/2004 | Kanehara et al. | |
| 2004/0127319 A1 | 7/2004 | Brandsma et al. | |

* cited by examiner

CONTINUOUSLY VARIABLE TRANSMISSION BELT AND CONTINUOUSLY VARIABLE TRANSMISSION

CROSS-REFERENCE TO RELATED APPLICATIONS

The present application claims priority to Japanese patent application no. 2006-336050 filed on Dec. 13, 2006, the entire contents of which are hereby incorporated herein by reference.

BACKGROUND OF THE INVENTION

1. Field of the Invention

The invention relates to a continuously variable transmission belt wrapped around a driving pulley and a driven pulley, and to a continuously variable transmission having such a continuously variable transmission belt.

2. Description of the Related Art

Generally, a transmission is provided on a power transmission path from a motive power source of a vehicle to wheels. As such a transmission, a belt type continuously variable transmission is known. This belt type continuously variable transmission is constructed by wrapping a belt on a driving pulley and a driven pulley, and performs power transmission between the driving pulley and the driven pulley via the belt. By controlling the wrap-around radii of the belt on the driving pulley and on the driven pulley, the continuously variable transmission controls the speed change ratio between the driving pulley and the driven pulley. An example of the driving belt used in the belt type continuously variable transmission is described in Japanese Patent Publication No. 2-22254. The driving belt described in Japanese Patent Publication No. 2-22254 has a carrier made up of a band combination composed by superimposing endless bands on one another, and many metallic cross members that are slidably mounted on the carrier. Each cross member has a neck portion, and two recesses are formed on both sides of the neck portion.

Incidentally, a lubrication device for a belt type continuously variable transmission that has a continuously variable transmission belt is described in Japanese Patent Application Publication No. 10-141459 (JP-A-10-141459). In Japanese Patent Application Publication No. 10-141459 (JP-A-10-141459), oil feed nozzles for supplying lubrication oil to the belt are disposed on both the input pulley side and the output pulley side. The belt has rings and elements. As the belt is driven, relative sliding between the rings and the elements occur, so that friction heat is generated on the contact surfaces. Therefore, by supplying lubrication oil from the oil feed nozzles to the friction heat generating portions, the friction heat generating portions can be lubricated, so that friction heat becomes relatively unlikely to be generated.

In the case where the lubrication of the belt described in Japanese Patent Application Publication No. 10-141459 (JP-A-10-141459) is performed in a belt type continuously variable transmission having a belt described in Japanese Patent Publication No. 2-22254, lubrication oil is not easily supplied deeply into the dents of the elements, that is, to the vicinity of the neck portion of each element. Therefore, the friction coefficient in the width direction of the carrier is higher in the interior-depth side of each dent, that is, regions near the neck portions, than in regions apart from the neck portions. As a result, there is a possibility of decline in the centering performance of the carrier in the width direction of the dents; for example, the line of the center of the carrier in the width direction may deviate from the line of the center of the driving belt in the width direction in a plane viewed from an outer periphery side of the carrier, or bands constituting the carrier tilt with each other.

SUMMARY OF THE INVENTION

This invention has been accomplished against the background of the aforementioned circumstances. The invention provides a continuously variable transmission belt in which rings disposed in ring-receiving portions of individual elements are capable of restraining the decline in the widthwise centering characteristic at the ring-receiving portions, and a continuously variable transmission.

Accordingly, there is provided a continuously variable transmission belt that has rings each constructed by superimposing annular component pieces on each other's inner and outer peripheries, and a plurality of elements stacked in a circumferential direction of the rings and attached to the rings, wherein each of the elements is provided with a neck portion extending in a radius direction of the rings, and each of the elements is provided with two ring-receiving portions on two opposite sides of the neck portion in a width direction of the rings, and the rings are disposed in the two ring-receiving portions, respectively, and the elements contact a driving pulley and a driven pulley, the continuously variable transmission belt being characterized by including a lubrication oil discharge mechanism that discharges out a lubrication oil that is in at least one of a gap between the annular component pieces, and a gap between each ring and the elements, and the lubrication oil discharge mechanism has a construction in which a function of discharging the lubrication oil present in a region that is remote from the neck portion in a width direction of the rings is higher than a function of discharging the lubrication oil present in a region that is near the neck portion in the width direction of the rings.

According to the above-described continuously variable transmission belt, the belt has two rings constructed by superimposing annular component pieces on each other's inner and outer peripheries, and a plurality of elements stacked in a circumferential direction of the two rings and attached to the rings. Each of the elements is provided with a neck portion extending in the radius direction of the rings. Besides, each of the elements is provided with two ring-receiving portions on the two opposite sides of the neck portion in the width direction of the rings. The two rings are disposed in the two ring-receiving portions, respectively. Thus, the continuously variable transmission belt is constructed. When the continuously variable transmission belt is wrapped around the driving pulley and the driven pulley, the elements of the belt contact the driving pulley and the driven pulley. Furthermore, when lubrication oil is supplied and gets into the two ring-receiving portions, the lubrication oil enters the gaps between the two rings and the elements and the gaps between the component pieces, thus restraining heat generation. In this manner, when lubrication oil is supplied to the ring-receiving portions, the supplied amount of lubrication oil is larger in a region that is apart from the neck portion in the width direction of the rings than in a region that is near the neck portion in the width direction of the rings. This is because the path of passage of lubrication oil is shorter in the region that is apart from the neck portion in the width direction of the rings than in the region that is near the neck portion in the width direction of the rings.

The lubrication oil that has got in either the gaps between the component pieces or the gaps between the two rings and the elements or both groups of gaps is discharged to the outside by the lubrication oil discharge mechanism. As for the lubrication oil discharge mechanism, the function of discharging out the lubrication oil present in a region that is remote from the neck portion in the width direction of the rings is higher than the function of discharging out the lubrication oil present in a region that is near the neck portion in the width direction of the rings. Therefore, in the width direction of the rings, the remaining amount of lubrication oil is equalized, so that the friction forces that occur on the mutual contact surfaces of the component pieces in the width direction or the friction forces that occur on the contact surfaces of the rings and the elements are equalized. Therefore, in the ring-receiving portions, the tilt of each ring in the width direction thereof or the tilt of the component pieces relative to each other is restrained, so that the centering performance improves.

In the foregoing continuously variable transmission belt, it is also preferred that the lubrication oil discharge mechanism have a first groove provided on each of an inner periphery and an outer periphery of the annular component pieces, and a second groove provided on each of the elements, and that the function of discharging the lubrication oil present in the region that is remote from the neck portion in the width direction of the rings be made higher than the function of discharging the lubrication oil present in the region that is near the neck portion in the width direction of the rings by, in a plane on the rings viewed from an outer periphery side or an inner periphery side, making an area of the first groove present in the region that is remote from the neck portion in the width direction of the rings larger than the area of the first groove present in the region that is near the neck portion in the width direction of the rings, and that the function of discharging the lubrication oil present in the region that is remote from the neck portion in the width direction of the rings be made higher than the function of discharging the lubrication oil present in the region that is near the neck portion in the width direction of the rings by, in the plane on the rings viewed from the outer periphery side or the inner periphery side, making the area of the second groove present in the region that is remote from the neck portion in the width direction of the rings larger than the area of the second groove present in the region that is near the neck portion in the width direction of the rings.

According to the above-described continuously variable transmission belt, lubrication oil is discharged (thrown off) to the outside via the first groove and the second groove. This is because the kinetic energy of the lubrication oil adhering to the continuously variable transmission belt is smaller than the kinetic energy of the continuously variable transmission belt. In a plane on the rings viewed from the inner periphery side or the outer periphery side, the area of the first groove present in the region that is remote from the neck portion in the width direction of the rings is larger than the area of the first groove present in the region that is near the neck portion in the width direction of the rings. Therefore, in the gaps between the component pieces constituting the rings, the amount of lubrication oil discharged from the region that is remote from the neck portion in the width direction of the rings becomes larger than the amount of lubrication oil discharged from the region that is near the neck portion in the width direction of the rings. Besides, in the plane on the rings viewed from the outer periphery side or the inner periphery side, the area of the second groove present in the region that is remote from the neck portion in the width direction of the rings is larger than the area of the second groove present in the region that is near the neck portion in the width direction of the rings. Therefore, the amount of lubrication oil discharged from the region that is remote from the neck portion in the width direction of the rings becomes larger than the amount of lubrication oil discharged from the region that is near the neck portion in the width direction of the rings.

According to another aspect of the invention, there is provided a continuously variable transmission belt that has a ring constructed by superimposing annular component pieces on each other's inner and outer peripheries, and a plurality of elements stacked in a circumferential direction of the ring and attached to the ring, wherein each of the elements is provided with an inward-side portion and a holder portion extending in a width direction of the ring from a neck portion extending in a radius direction of the ring, and each of the elements is provided with a ring-receiving portion between the inward-side portion and the holder portion in the width direction of the ring, and the ring is disposed in the ring-receiving portion, and the elements contact a driving pulley and a driven pulley, the continuously variable transmission belt being characterized by including a lubrication oil discharge mechanism that discharges out a lubrication oil that is in at least one of a gap between the annular component pieces, and a gap between the ring and the elements, and the lubrication oil discharge mechanism has a construction in which a function of discharging the lubrication oil present in a region that is remote from the neck portion in a width direction of the ring is higher than a function of discharging the lubrication oil present in a region that is near the neck portion in the width direction of the ring.

According to the continuously variable transmission belt, each of the elements is provided with a ring-receiving portion between the inward-side portion and the holder portion in the width direction of the ring. Then, the ring is disposed in the ring-receiving portion. Thus, the continuously variable transmission belt is constructed. When the continuously variable transmission belt is warped around the driving pulley and the driven pulley, the elements contact the driving pulley and the driven pulley. Furthermore, when lubrication oil is supplied and gets into the ring-receiving portion, the lubrication oil passes through the gap between the ring and the neck portion, and then is supplied into the gaps between the ring and the elements and the gaps between the component pieces, thus restraining heat generation. In this manner, when lubrication oil is supplied to the ring-receiving portion, the supplied amount of lubrication oil is larger in a region that is near the neck portion in the width direction of the ring than in a region that is apart from the neck portion in the width direction of the ring. This is because the path of passage of lubrication oil is shorter in the region that is near the neck portion in the width direction of the ring than in the region that is apart from the neck portion in the width direction of the ring.

The lubrication oil that has got in either the gaps between the component pieces or the gaps between the ring and the elements or both groups of gaps is discharged to the outside by the lubrication oil discharge mechanism. The amount of lubrication oil discharged from a region that is remote from the neck portion in the width direction of the ring is larger than the amount of lubrication oil discharged from a region that is near the neck portion in the width direction of the ring. Therefore, in the width direction of the ring in the ring-receiving portion, the remaining amount of lubrication oil is equalized, so that the friction forces that occur on the mutual contact surfaces of the component pieces in the width direction or the friction forces that occur on the contact surfaces of the ring and the elements are equalized. Therefore, in the ring-receiving portions, the tilt of the ring in the width direction thereof or the tilt of the component pieces relative to each other is restrained, so that the centering performance improves.

In the foregoing continuously variable transmission belt, it is also preferred that the lubrication oil discharge mechanism have a first groove provided on each of an inner periphery and an outer periphery of the annular component pieces, and a second groove provided on each of the elements, and that a function of discharging the lubrication oil present in the region that is remote from the neck portion in the width direction of the ring is made higher than the function of discharging the lubrication oil present in the region that is near the neck portion in the width direction of the ring by, in a plane on the ring viewed from an outer periphery side or an inner periphery side, making an area of the first groove present in the region that is near the neck portion in the width direction of the ring smaller than an area of the first groove present in the region that is remote from the neck portion in the width direction of the ring, and that the function of discharging the lubrication oil present in the region that is near the neck portion in the width direction of the ring is made higher than the function of discharging the lubrication oil present in the region that is remote from the neck portion in the width direction of the ring by, in the plane on the ring viewed from the outer periphery side or the inner periphery side, making an area of the second groove present in the region that is near the neck portion in the width direction of the ring smaller than an area of the second groove present in the region that is remote from the neck portion in the width direction of the ring.

According to the above-described continuously variable transmission belt, lubrication oil is discharged to the outside via the first groove and the second groove. This is because the kinetic energy of the lubrication oil adhering to the continuously variable transmission belt is smaller than the kinetic energy of the continuously variable transmission belt. Concretely, lubrication oil is discharged through the gaps between adjacent elements. In a plane on the ring viewed from the outer periphery side or the inner periphery side, the area of the first groove present in the region that is near the neck portion in the width direction of the ring is smaller than the area of the first groove present in the region that is apart from the neck portion in the width direction of the ring. Therefore, in the gaps between the component pieces constituting the ring, the amount of lubrication oil discharged from the region that is remote from the neck portion in the width direction of the ring becomes larger than the amount of lubrication oil discharged from the region that is near the neck portion in the width direction of the ring. Besides, in the plane on the ring viewed from the outer periphery side or the inner periphery side, the area of the second groove present in the region that is near the neck portion in the width direction of the ring is smaller than the area of the second groove present in the region that is apart from the neck portion in the width direction of the ring. Therefore, the amount of lubrication oil discharged from the region that is near the neck portion in the width direction of the ring becomes larger than the amount of lubrication oil discharged from the region that is apart from the neck portion in the width direction of the ring.

According to still another aspect of the invention, there is provided a continuously variable transmission belt that has a ring constructed by superimposing annular component pieces on each other's inner and outer peripheries, and a plurality of elements stacked in a circumferential direction of the ring and attached to the ring, wherein each of the elements is provided with a ring-receiving portion, and the ring is disposed in the ring-receiving portion, and the elements contact a driving pulley and a driven pulley, the continuously variable transmission belt being characterized by including a friction force equalization mechanism that makes a friction force that occurs due to contact between a bottom surface that constitutes the ring-receiving portion and an inner peripheral surface of the ring uniform in the width direction of the ring.

According to the foregoing continuously variable transmission belt, the elements are stacked and attached to the ring. Thus the continuously variable transmission belt is constructed. When the continuously variable transmission belt is warped around the driving pulley and the driven pulley, the elements contact the driving pulley and the driven pulley. Besides, when lubrication oil enters the ring-receiving portion of each element, the friction force that occurs due to the contact between the bottom surface forming the ring-receiving portion and the inner peripheral surface of the ring is equalized in the width direction of the ring. Therefore, in the ring-receiving portions, the tilt of the ring in the width direction thereof or the tilt of the component pieces relative to each other is restrained, so that the centering performance improves.

In the foregoing continuously variable transmission belt, it is also preferred that each of the elements be provided with a neck portion extending in a radius direction of the ring, and each of the elements be provided with two ring-receiving portions on two opposite sides of the neck portion in the width direction of the rings, and the ring be disposed in each of the two ring-receiving portions, and the bottom surface of each of the two ring-receiving portions and the inner peripheral surface of a corresponding one of the rings contact each other, and that the friction force equalization mechanism be a partition groove that partitions each bottom surface into a first region near to the neck portion and a second region apart from the neck portion, and that prevent the lubrication oil from reaching the first region via the second region, and an area of the first region be smaller than the area of the second region.

According to the foregoing continuously variable transmission belt, each of the elements is provided with two ring-receiving portions on the two opposite sides of the neck portion in the width direction of the rings, and the rings are disposed in the two ring-receiving portions, respectively. Then, the bottom surface forming each of the two ring-receiving portions is partitioned into the first region and the second region. The area of the first region is smaller than the area of the second region. Besides, lubrication oil is prevented from reaching the first groove via the second groove. If the amount of lubrication oil is large, the friction coefficient becomes small. Therefore, the friction force determined from area, friction coefficient, etc., becomes substantially uniform between the first region and the second region, so that the decline in the centering performance of the rings can be restrained.

In the foregoing continuously variable transmission belt, it is also preferred that each of the elements be provided with two neck portions extending in a radius direction at different positions in the width direction of the ring, and a ring-receiving portion be provided between the two neck portions, and the ring be disposed in the ring-receiving portion, and a bottom surface forming the ring-receiving portion and the inner peripheral surface of the ring contact each other, and that the friction force equalization mechanism be a partition groove that partitions each bottom surface into two outer-side regions near to the neck portion and an inner-side region apart from the neck portion, and that prevents the lubrication oil from reaching the inner-side region via the outer-side regions, and an area of the inner-side region be smaller than the area of one of the outer-side regions.

According to the foregoing continuously variable transmission belt, each of the elements is provided with a ring-receiving portion between the two neck portions in the width direction of the ring, and the ring is disposed in the ring-receiving portion. The bottom surface forming the ring-receiving portion and the inner peripheral surface of the ring contact each other. The bottom surface forming the ring-receiving portion is partitioned into the outer-side regions and the inner-side region. The area of the inner-side region is smaller than one of the outer-side regions. Besides, lubrication oil is prevented from reaching the inner-side region via the outer-side regions. If the amount of lubrication oil is large, the friction coefficient becomes small. Therefore, the friction force determined from area, friction coefficient, etc., becomes substantially uniform between the inner-side region and the outer-side regions, so that the decline in the centering performance of the ring can be restrained.

According to a further aspect of the invention, there is provided a continuously variable transmission that has a driving pulley, a driven pulley, and a continuously variable transmission belt wrapped around the driving pulley and the driven pulley, wherein the continuously variable transmission belt has rings each constructed by superimposing annular component pieces on each other's inner and outer peripheries, and a plurality of elements stacked in a circumferential direction of the rings and attached to the rings, and each of the elements is provided with a neck portion extending in a radius direction of the rings, and each of the elements is provided with two ring-receiving portions on two opposite sides of the neck portion in a width direction of the rings, and the rings are disposed in the two ring-receiving portions, respectively, the continuously variable transmission being characterized by including an air blowing mechanism that blows air toward the ring-receiving portions to move a lubrication oil present in each ring-receiving portion to an interior depth side of the ring-receiving portion so that in a plane on the continuously variable transmission belt viewed from an outer periphery side or an inner periphery side, a difference between a friction force on mutual contact portions of the component pieces in a region that is near the neck portion in the width direction of the continuously variable transmission belt or a friction force that occurs on contact portions between an inner peripheral surface of each ring and the elements (18), and a friction force on mutual contact portions of the component pieces in a region that is apart from the neck portion in the width direction of the continuously variable transmission belt or a friction force that occurs on contact portions between the inner peripheral surface of each ring and the elements is made small.

It is also preferred that the continuously variable transmission belt wrapped around the driving pulley and the driven pulley be provided with a lubrication oil supply device that supplies the lubrication oil, between the driving pulley and the driven pulley, and that the air blowing mechanism be provided rearward of the lubrication oil supply device in a rotation direction of the continuously variable transmission belt. Furthermore, it is also preferred that the lubrication oil supply device and the air blowing mechanism be positioned between a point where the continuously variable transmission belt comes out of a wrapping on the driven pulley and a point where the continuously variable transmission belt becomes wrapped on the driving pulley, and supply the lubrication oil and blow air.

According to the foregoing continuously variable transmission, each of the elements is provided with ring-receiving portions, and the rings are disposed in the ring-receiving portions. Thus the continuously variable transmission belt is constructed. When the continuously variable transmission belt is wrapped around the driving pulley and the driven pulley, the elements contact the driving pulley and the driven pulley. Furthermore, lubrication oil is supplied to the ring-receiving portions, and the lubrication oil in each ring-receiving portion is moved to the interior-depth side of the ring-receiving portion by blowing air toward each ring-receiving portion in the rear of the lubrication oil supply device in the rotation direction. Due to this operation, in a plane on the continuously variable transmission belt viewed from the outer periphery side or the inner periphery side, a difference between the friction force on mutual contact portions of the component pieces in a region that is near the neck portion in the width direction of the continuously variable transmission belt or the friction force that occurs on contact portions between the inner peripheral surface of each ring and the elements, and the friction force on mutual contact portions of the component pieces in a region that is apart from the neck portion in the width direction of the continuously variable transmission belt or the friction force that occurs on contact portions between the inner peripheral surface of each ring and the elements becomes small. Therefore, in each ring-receiving portion, the tilt of the ring in the width direction thereof or the tilt of the component pieces relative to each other is restrained, so that the centering performance improves.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

Figure 1:
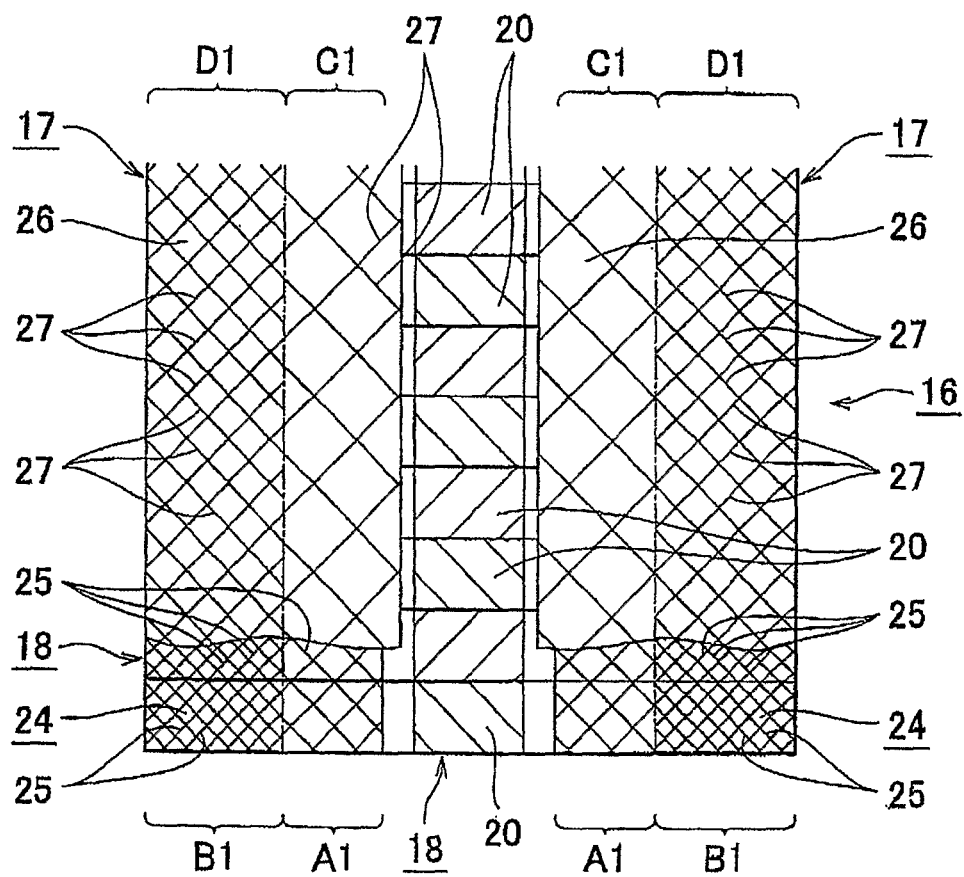
FIG. 1 is a partial plan sectional view of a continuously variable transmission belt in accordance with a first embodiment of the invention, viewed from an outer periphery side.

In the following description and the accompanying drawings, the invention will be described in more detail with reference to exemplary embodiments.

A concept of a construction in which a continuously variable transmission belt and a belt type continuously variable transmission of the invention are employed in a vehicle will be described. This belt type continuously variable transmission is disposed on a power transmission path from a drive force source of the vehicle to wheels thereof. This belt type continuously variable transmission has a driving pulley and a driven pulley. The drive force source and the driving pulley are interconnected so that power can be transmitted therebetween, and the driven pulley and the wheels are interconnected so that power can be transmitted therebetween. The aforementioned vehicle may be either a two-wheel drive vehicle or a four-wheel drive vehicle. That is, the vehicle may be either a two-wheel drive vehicle having a power train constructed so that power from the drive force source is transmitted to either the front wheels (tire wheels) or the rear wheels (tire wheels), or a four-wheel drive vehicle having a power train constructed so that the power from the drive force source is transmitted to all of the front wheels and the rear wheels. The four-wheel drive vehicle may be a full-time four-wheel drive vehicle in which power from the drive force source is transmitted to the front wheels and the rear wheels all the time, or a standby four-wheel drive vehicle capable of switching between a two-wheel drive state and a four-wheel drive state.

The drive force source is a power device that generates torque to be transmitted to the wheels. For example, it is possible to mount one of or a combination of two or more of an engine, a motor-generator, a hydraulic motor, a fly wheel system, etc. in the vehicle. The engine is a device that converts thermal energy generated by combusting fuel into kinetic energy, and may be, for example, an internal combustion engine. The motor-generator is a power device equipped with both a power running function of converting electric energy into kinetic energy and a regenerative function of converting kinetic energy into electric energy. The hydraulic motor is a device that converts fluid energy of a hydraulic oil into kinetic energy of a rotating member. The fly wheel system is a device capable of storing kinetic energy. That is, all of these power devices are different in the principle of power generation.

It is also possible to provide a clutch that controls the torque transmitted between the drive force source and the wheels. This clutch may be provided on either one of a path from the drive force source the driving pulley and a path from the driven pulley to the wheels. Besides, the clutch is a power transmission device in which the transmission torque or the torque capacity can be controlled. For example, it is possible to use an electromagnetic clutch, a fluid clutch, a friction clutch, etc. Furthermore, it is possible to provide a forward-backward travel switch device on a power transmission path from the drive force source to the wheels. The forward-backward travel switch device is a device that switches the rotation direction of an output-side rotating member relative to the rotation direction of an input-side rotating member between the normal and reverse directions, and may be provided on either a path from the drive force source to the belt type continuously variable transmission or a path from the belt type continuously variable transmission to the wheels. The forward-backward travel switch device may be, for example, a planetary gear mechanism type forward-backward travel switch device, a parallel-axis gear type forward-backward travel switch device, etc. In the continuously variable transmission belt of this invention, many elements are stacked and mounted in a circumferential direction of annular rings. Due to the compression force generated between the elements, torque is transmitted between the driving pulley and the driven pulley. Besides, the rings have functions of a carrier, that is, functions of retaining a large number of elements in an aligned state and retaining the elements so that the elements are rotatable relative to each other. In this invention, the driving pulley is a pulley on the side where power is input, and is constructed so that torque of the driving pulley is transmitted to the driven pulley via the belt.

Figure 2:
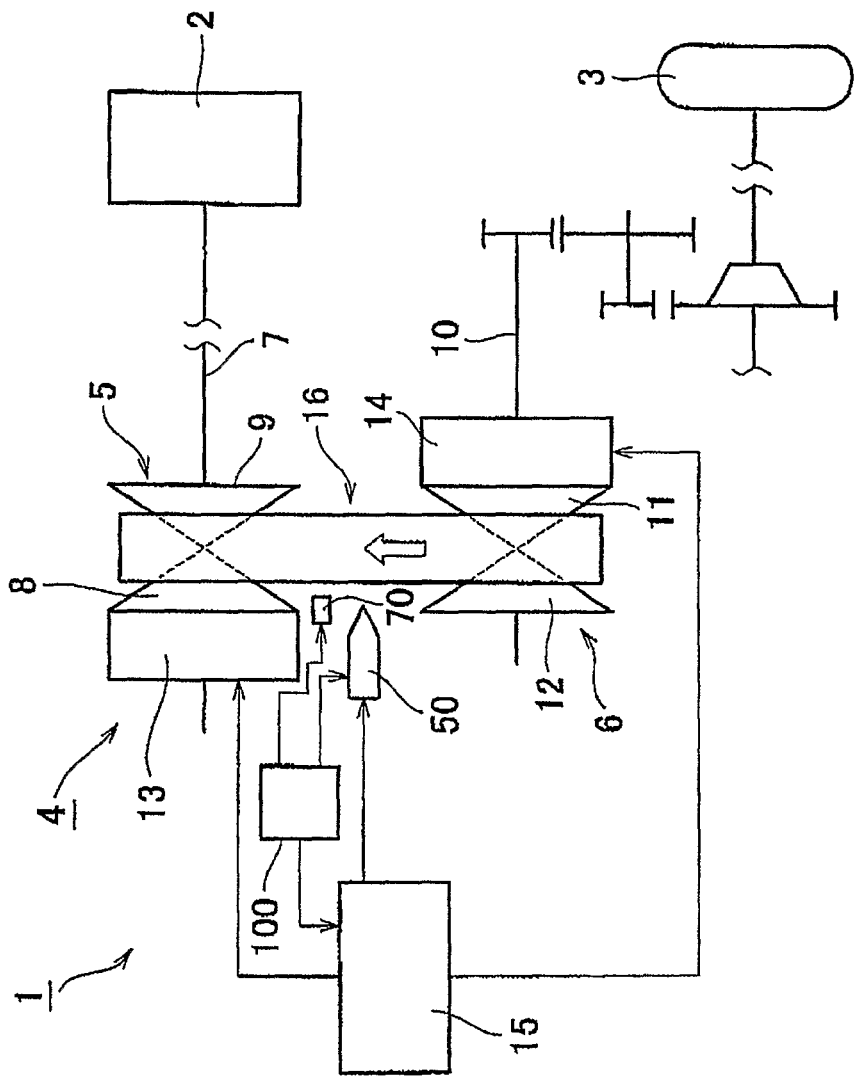
FIG. 2 is a conceptual diagram showing a power train and its control system of a vehicle that has a continuously variable transmission in accordance with the invention.

A power train and a control system of a vehicle that has a continuously variable transmission to which various embodiments of the invention are applied will be described with reference to FIG. 2. Firstly, a vehicle 1 is equipped with a drive force source 2. A continuously variable transmission, concretely, a belt type continuously variable transmission 4, is disposed on a power transmission path from the drive force source 2 to wheels 3. Incidentally, although it is possible to provide a forward-backward travel switch device on a path from the drive force source 2 to the belt type continuously variable transmission 4 or a path from the belt type continuously variable transmission 4 to the wheels 3, such an arrangement is omitted from the illustration of this embodiment. Furthermore, although it is possible to provide a clutch on a path from the drive force source 2 to the belt type continuously variable transmission 4 or a path from the belt type continuously variable transmission 4 to the wheels 3, such an arrangement is omitted from the illustration of this embodiment. The belt type continuously variable transmission 4 has a driving pulley 5 that is a first pulley, and a driven pulley 6 that is a second pulley. The driving pulley 5 and the drive force source 2 are interconnected so that power can be transmitted.

The driving pulley 5 is constructed so as to rotate integrally with an input shaft 7. This driving pulley 5 has a movable piece 8 that is actuatable in a, direction parallel to the rotation axis of the input shaft 7 (which direction is termed "axis direction"), and a stationary piece 9 that is not actuatable in the axis direction. Besides, the driven pulley 6 and the wheels 3 are interconnected so that power can be transmitted. Furthermore, the rotation axis (not shown) of the driving pulley 5 and the rotation axis (not shown) of the driven pulley 6 are disposed in parallel and substantially horizontally. The driven pulley 6 is constructed so as to rotate integrally with an output shaft 10. The driven pulley 6 has a movable piece 11 that is actuatable in a direction parallel to the rotation axis of the output shaft 10 (which direction is termed "axis direction"), and a stationary piece 12 that is not actuatable in the axis direction. The driving pulley 5 and the driven pulley 6 are each constructed so as to be able to adjust the groove width of the pulley by actuating the movable pieces 8, 11 in the axis direction.

Furthermore, a hydraulic servo mechanism 13 that controls the position of the movable piece 8 of the driving pulley 5 in the axis direction is provided. The hydraulic servo mechanism 13 is a well-known mechanism that has a hydraulic chamber, a piston, a return spring, etc. Besides, a hydraulic servo mechanism 14 that controls the position of the movable piece 11 of the driven pulley 6 in the axis direction is also provided. The hydraulic servo mechanism 14 is a well-known mechanism that has a hydraulic chamber, a piston, a return spring, etc. An oil pressure control device 15 is provided as an actuator that controls the oil pressure of the hydraulic chambers of the hydraulic servo mechanisms 13, 14 or the amount of hydraulic oil supplied to the hydraulic chambers. That is, the belt type continuously variable transmission 4 is of a hydraulically controlled type. Incidentally, in the case where the aforementioned clutch is a fluid clutch or a friction clutch, it is possible to adopt a construction in which the torque transmitted by the clutch is controlled by the oil pressure control device 15. The oil pressure control device 15 is a known device having a hydraulic circuit, a valve, etc., and is controlled by an electronic control device 100. Besides, in the case where the forward-backward travel switch device is provided, it is possible to use the oil pressure control device 15 as an actuator of the forward-backward travel switch device. An annular continuously variable transmission belt is wrapped around the driving pulley 5 and the driven pulley 6. Furthermore, a lubrication oil supply device 50 is connected to the oil pressure control device 15 via an oil passageway. This lubrication oil supply device 50 supplies lubrication oil to heat-generating portions and sliding portions of the belt type continuously variable transmission 4 so as to cool and lubricate these portions. The lubrication oil supply device 50 has a valve, a jet nozzle, etc. The lubrication oil supply device 50 is constructed to be controlled by the electronic control device 100. The lubrication oil supply device 50 is capable of adjusting a lubrication oil supply timing, a lubrication oil supply duration, a lubrication oil supply amount, a lubrication oil supply pressure (jet pressure), a lubrication oil supply angle with respect to the belt 16, etc. Hereinafter, concrete construction examples of the continuously variable transmission belt will be sequentially described.

Figure 3:
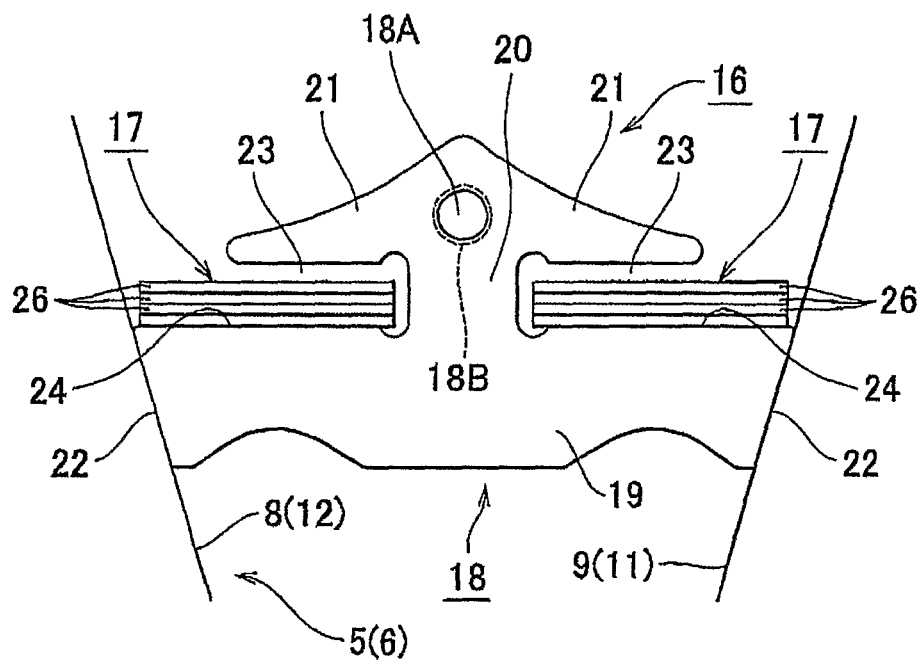
FIG. 3 is a vertical sectional view of the continuously variable transmission belt shown in FIG. 1, in a direction of the thickness of the belt.

A first embodiment will be described with reference to FIGS. 1 and 3. FIG. 1 is a partial plan sectional view of a continuously variable transmission belt (hereinafter, simply termed the belt) 16, viewed from an outer periphery side. FIG. 3 is a vertical sectional view (front vertical sectional view) of the belt 16 in a thickness direction thereof. The belt 16 has two rings 17 and a plurality of (many) elements 18 attached to the two rings 17. The many elements 18 are formed through a press process of a metal material. The elements 18 are attached to the two rings 17 and juxtaposed in a circumferential direction of the rings 17. In the circumferential direction of the rings 17, adjacent elements 18 are in contact with each other. Each element 18 has a base portion (plate-shape portion) 19 disposed along the width direction of the belt 16, a neck portion 20 being continuous from the base portion 19 and protruded to an outward side in a radius direction of the belt 16, and a holder portion 21 being continuous from the neck portion 20 and disposed along the width direction of the belt 16. The holder portion 21 is protruded from an upper end of the neck portion 20 to both sides in the width direction of the belt 16. That is, the neck portion 20 is a portion connecting the base portion 19 and the holder portion 21. The width direction of the belt 16 means a direction of substantially along the width direction of the belt 16, or a direction parallel to the width of the belt 16. Contact surfaces 22 are formed on two opposite ends of the base portion 19 in the width direction of the belt 16. Each of the two contact surfaces 22 of each element 18 is titled with respect to a line of the center (not shown) of the element 18 in the width direction of the belt 16 so that the distance between the two contact surfaces 22 in the width direction of the belt 16 becomes shorter toward an inner periphery side of the belt 16. The belt 16 is wrapped around the driving pulley 5 and the driven pulley 6, and the contact surfaces 22 of the elements 18 contact the driving pulley 5 and the driven pulley 6 as shown in FIG. 3.

A protruded pin 18A is provided on one of two sides of an upper portion of each element 18 in the thickness direction. A recess 18B is provided on the other side of the upper portion of each element 18 in the thickness direction. When the elements 18 are superimposed on one another in the thickness direction, the pins 18A of elements 18 are disposed in the recesses 18B of the adjacent elements 18A, whereby elements 18 disposed at adjacent positions are defined in position relative to each other, concretely, defined in position relative to each other on a plane orthogonal to the stacking direction of the elements 18. In the width direction of the belt 16, the length (width) of the base portion 19 is longer than the length (width) of the holder portion 21. Due to this construction, each element 18 is provided with ring-receiving portions 23 between the base portion 19 and the holder portion 21 in a radius direction of the belt 16 (an inner-to-outer periphery direction thereof). Concretely, the radius direction of the belt 16 means the same direction as the radius direction of the belt 16, or a direction substantially along the radius direction. Upper end surfaces (surfaces) 24 of the base portion 19 are substantially flat, and the flat upper end surfaces 24 form bottom surfaces of the ring-receiving portions 23. Specifically, two upper end surfaces 24 are provided on both sides of the neck portion 20 in the width direction of the belt 16. Each upper end surface 24 is provided with a lubrication oil discharge mechanism that discharges the lubrication oil present between the upper end surface 24 and the ring 17, to the outside of the ring-receiving portion 24.

In the first embodiment, grooves 25 are provided as a lubrication oil discharge mechanism. The grooves 25 are recesses or dents having a depth in the radius direction of the belt 16 in FIG. 3, and also are in a checkered pattern formed by intersecting linear grooves 25 with each other in FIG. 1. Besides, as shown in FIG. 1, the density of the grooves 25 is different between a region A1 and a region B1 that are provided at different positions on each upper end surface 24 in the width direction of the belt 16. On each upper end surface 24, the region A1 is disposed on an interior depth side of the ring-receiving portion 23 in the width direction of the belt 16, and the region B1 is disposed on an entrance side of the ring-receiving portion 23 in the width direction of the belt 16. In other words, on each upper end surface 24, the region A1 is at a position that is relatively near the neck portion 20, and the region B1 is at a position that is apart from the neck portion 20. Furthermore, in a plan view of the belt 16 taken from the outside thereof, the position of the region A1 substantially overlaps with the position of the holder portion 21. Then, in each upper end surface 24, the density of the grooves 25 provided in the region B1 is higher than the density of the grooves 25 provided in the region A1. Specifically, while the regions A1, 131 are both provided with plural grooves 25 parallel to each other, the intervals between the grooves 25 provided in the region B1 are shorter than the intervals between the grooves 25 provided in the region A1. In other words, the density of the grooves 25 per unit area in the regions B1 is higher than the density of the grooves 25 per unit area in the regions A1. That is, the area of the grooves 25 per unit area in the regions B1 is larger than the area of the grooves 25 per unit area in the regions A1.

Next, the construction of the two rings 17 will be described. Each ring 17 is constructed by layering a plurality of metal-made annular thin sheets 26 on each other's inner and outer peripheries, that is, in the inner-to-outer periphery direction. That is, the thin sheets 26 are superimposed on one another in the thickness direction to construct a ring 17. Besides, the thin sheets 26 in the superimposed state are slidable relative to one another in the circumferential direction. Besides, the thin sheets 26 have the same width in the width direction of the belt 16. In the width direction of the belt 16, the width of the individual thin sheets 26 is narrower than the width of each of the upper end surfaces 24 of the elements 18. The many elements 18 are attached to the rings 17 constructed as described above. Concretely, each ring 17 is disposed in a corresponding one of the ring-receiving portions 23. When each ring 17 has been received in a corresponding one of the ring-receiving portions 23 of each element 18, a substantially half of the ring 17 in the width direction of the belt 16 is positioned inside the ring-receiving portion 23, and the other half of the ring 17 is positioned (exposed) outside the ring-receiving portion 23. That is, in the width direction of the belt 16, the width of each ring 17 is larger than the width of each ring-receiving portion 23. Incidentally, the width (height) of the ring-receiving portions 23 in the radius direction of the belt 16 is constant, and the thickness of the rings 17 is less than the width (height) of the ring-receiving portions 23. Therefore, the elements 18 are slidable relative to the rings 17 in the circumferential direction of the rings 17.

At least one of inner and outer peripheral surfaces of each of the thin sheets 26 constituting each ring 17 is provided with grooves 27 as a lubrication oil discharge mechanism. The grooves 27 are recesses or dents having a depth in the thickness direction of each thin sheet 26. In FIG. 1, the grooves 27 are provided on the outer peripheral surface of each thin sheet 26 as an example construction. Concretely, a checkered pattern is formed by intersecting linear grooves 27 with each other. Besides, as shown in FIG. 1, the density of grooves 27 is different between a region C1 and a region D1 that are disposed at different positions on each thin sheet 26 in the width direction of the belt 16. On each thin sheet 26, the region C1 is disposed on an interior depth side of the ring-receiving portion 23 in the width direction of the belt 16, and the region D1 is disposed on an entrance side of the ring-receiving portion 23 in the width direction of the belt 16. In other words, on each thin sheet 26, the region C1 is closer to the neck portion 20, and the region D1 is more apart from the neck portion 20. Then, the density of the grooves 27 provided in the region D1 is higher than the density of the grooves 27 provided in the region C1. Specifically, while the regions C1, D1 are both provided with plural grooves 27 parallel to each other, the intervals between the grooves 27 provided in the region D1 are shorter than the intervals between the grooves 27 provided in the region C1. In other words, the density of the grooves 27 per unit area in the region D1 is higher than the density of the grooves 27 per unit area in the region C1.

The belt 16 constructed as described above is wrapped around the driving pulley 5 and the driven pulley 6. While the torque of the drive force source 2 is transmitted to the input shaft 7, a clamping force is applied from the driving pulley 5 and the driven pulley 6 to the belt 16. Via contact portions between the driving pulley 5 and elements 18, power transmission is performed in accordance with the friction force, and compression load is applied to the elements 18. The compression load is transmitted to the elements 18 that are in contact with the driven pulley 6, via the elements 18 located in a region of the belt 16 that is not wrapped around either the driving pulley 5 or the driven pulley 6. Due to the friction force between the elements 18 and the driven pulley 6, power corresponding to the compression load is transmitted to the driven pulley 6. In this manner, the torque of the driving pulley 5 is transmitted to the driven pulley 6. Then, the ratio between the rotation speed of the driving pulley 5 and the rotation speed of the driven pulley 6, that is, the speed change ratio, is controlled by controlling the clamping force applied from the driving pulley 5 to the belt 16 so as to control the wrap-around radii of the belt 16 on the driving pulley 5 and on the driven pulley 6. Besides, the capacity of the torque transmitted by the belt type continuously variable transmission 4 is controlled by controlling the clamping force applied from the driven pulley 6 to the belt 16. In this manner, the torque transmitted to the output shaft 10 is transmitted to the wheels 3, so that drive force is generated.

In regions of the belt 16 that is wrapped around the driving pulley 5 and the driven pulley 6 during the torque transmission in the belt type continuously variable transmission 4, the elements 18 disposed at adjacent positions rotate relative to each other in a certain angle range, with a rocking edge (not shown) being a fulcrum, so that each element 18 and the inner peripheral surface of each ring 17 slide on each other. Besides, since the ring 17 is constructed of the superimposed annular thin sheets 26, the circumferential speeds of the thin sheets 26 are different and the thin sheets 26 move relative to each other in the circumferential direction, in regions of the belt 16 wrapped on the driving pulley 5 and the driven pulley 6. When the wrap-around radii of the belt 16 on the driving pulley 5 and the driven pulley 6 is changed through the control of the clamping force applied from the driving pulley 5 and the driven pulley 6 to the belt 16, elements 18 slide along the inclined surfaces of the driving pulley 5 and the driven pulley 6. Thus, in the belt type continuously variable transmission 4, there are sites of heat generation due to the sliding of various component parts on each other. Therefore, lubrication oil is supplied (injected) from the lubrication oil supply device 50 toward the belt 16, so that these sliding portions are cooled and lubricated. For example, in regions of the belt 16 that are not wrapped around the driving pulley 5 or the driven pulley 6, the lubricating oil is supplied thereto from above the belt 16 or a side of the belt 16 via an jet nozzle or the like. Incidentally, the lubrication oil is injected to a side of the belt 16 to which a compression force is not applied. Specifically, lubrication oil is injected in a region from a site where the belt 16 departs from the driven pulley 6 to a site where the belt 16 is wrapped on the driving pulley 5.

Incidentally, in the belt 16, the rings 17 are disposed in the ring-receiving portions 23. Therefore, when lubrication oil is supplied, the supplied amount of lubrication oil is different between the entrance side and the interior depth side of each ring-receiving portion 23. Concretely, while a large amount of lubrication oil is supplied to the entrance of each ring-receiving portion 23, a less amount of lubrication oil is supplied to the interior depth side of each ring-receiving portion 23. A reason for this is that since the lubrication oil supply path (gap) to the interior depth side of each ring-receiving portion 23 is narrow, the flow resistance of lubrication oil is strong and also since the distance of the path is long, the kinetic energy of lubrication oil declines along the path. Then, the amount of lubrication oil supplied to the gap between the upper end surfaces 24 of each element 18 and the rings 17 varies in the width direction of the belt 16. Specifically, the amount of lubrication oil supplied to the regions B1 apart from the neck portion 20 is larger than the amount of lubrication oil supplied to The regions A1 near the neck portion 20.

Figure 4:
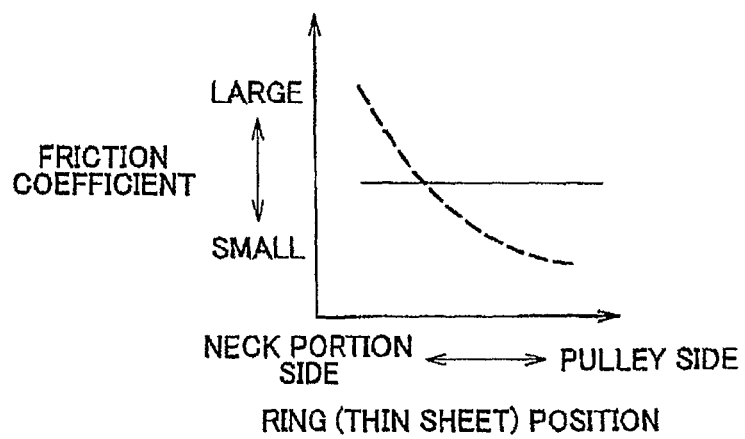
FIG. 4 is a graph showing a friction coefficient characteristic of a ring and a thin sheet that constitute the continuously variable transmission belt.
Figure 5:
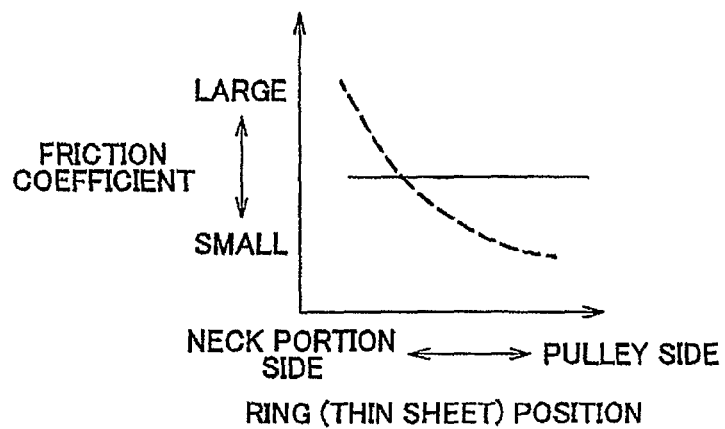
FIG. 5 is a graph showing friction force characteristic of the rings and the thin sheets that constitute the continuously variable transmission belt.
Figure 6:
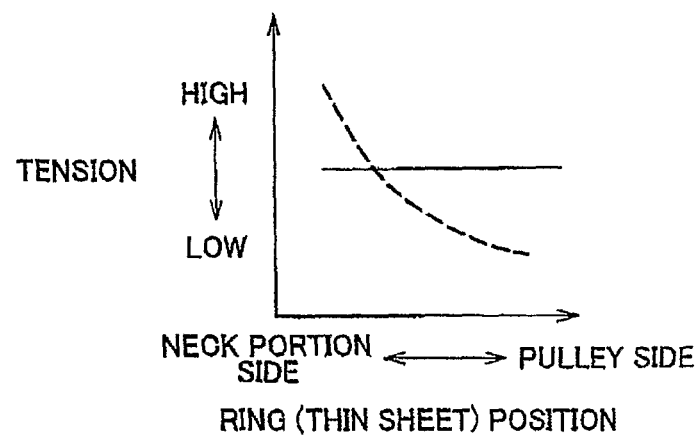
FIG. 6 is a graph showing a tension characteristic of the rings and the thin sheets that constitute the continuously variable transmission belt.
Figure 7:
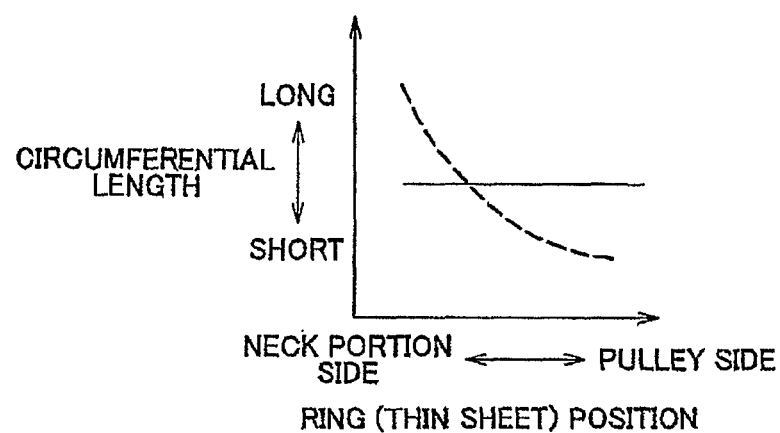
FIG. 7 is a graph showing a circumferential length of the rings and the thin sheets that constitute the continuously variable transmission belt.

A case (comparative example) in which the grooves 25 are not provided will be described. In such a case, the friction coefficient on the contact surfaces of the upper end surfaces 24 of the elements 18 and the inner peripheral surfaces of the rings 17 has a tendency as shown by a dashed line in FIG. 4. Specifically, the friction coefficient shows a characteristic of diminishing with the increasing distance from the neck portion 20 side toward the driving pulley 5 or the driven pulley 6. Then, the friction force on the contact surfaces of the upper end surfaces 24 of the elements 18 and the inner peripheral surfaces of the rings 17 have a tendency shown by a dashed line in FIG. 5. Specifically, the friction force has a characteristic of declining with the increasing distance from the neck portion 20 side toward the driving pulley 5 or the driven pulley 6. Besides, the tension of the each ring 17 as a whole varies in the width direction thereof. Concretely, as shown by a dashed line in FIG. 6, the tension has a tendency of declining with the increasing distance from the neck portion 20 side toward the driving pulley 5 or the driven pulley 6. Due to this tension characteristic, the circumference of each ring 17 or like also varies in the width direction. Concretely, as shown by a dashed line in FIG. 7, the tension has a tendency of declining with the increasing distance from the neck portion 20 side toward the driving pulley 5 or the driven pulley 6. Due to these principles, the movement force of each ring 17 in the circumferential direction has a characteristic as shown by arrows in FIG. 8. Concretely, the movement force F1 has a characteristic of declining with the increasing distance from the neck portion 20 side toward the driving pulley 5 or the driven pulley 6. This results in a state in which a line of the center (not shown) of each ring 17 in the width direction during motion is tilted with respect to a line of the center (not shown) of the ring 17 in the width direction during a stop of the belt 16. That is, there is a possibility of decline in the centering performance of each ring 17 within each ring-receiving portion 23.

Figure 8:
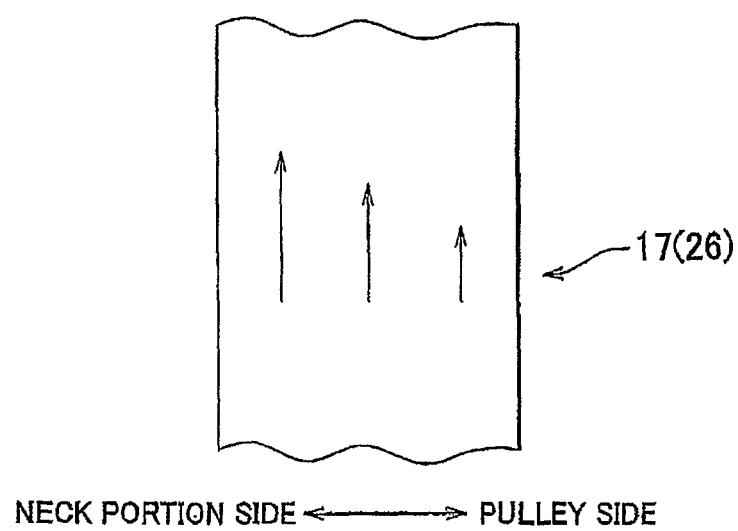
FIG. 8 is a partial plan view showing a movement force characteristic of the rings and the thin sheets that constitute the continuously variable transmission belt.

In the first embodiment, however, lubrication oil is discharged (thrown off) from the contact surfaces of the elements 18 and the rings 17 to the outside along the grooves 25. This is because the kinetic energy of the lubrication oil is less than the kinetic energy of the belt 16. Besides, in the first embodiment, the density of the grooves 25 in the regions B1 is higher than the density of the grooves 25 in the regions A1. Therefore, although the amount of lubrication oil supplied to the regions B1 is larger than the amount of lubrication oil supplied to the regions A1, the lubrication oil amount discharged from the regions B1 to the outside along the grooves 25 is larger than the lubrication oil amount discharged from the regions A1 to the outside along the grooves 25. Therefore, the lubrication oil amount present in the regions A1 and the lubrication oil amount present in the regions B1 are substantially equal. Hence, the friction coefficient shown in FIG. 4 becomes substantially constant irrespective of the position in the width direction of each ring 17 as shown by a characteristic line represented by a solid line. Furthermore, the friction force shown in the FIG. 5 becomes substantially constant irrespective of the position in the width direction of each ring 17 as shown by a characteristic line represented by a solid line. The tension of each ring 17 shown in FIG. 6 becomes substantially constant irrespective of the position in the width direction of each ring 17 as shown by a characteristic line represented by a solid line. The circumferential length of each ring 17 becomes substantially constant irrespective of the position in the width direction of each ring 17 as shown by a characteristic line represented by a solid line. Due to the aforementioned operations and characteristic combined, the movement force of each ring 17 as shown in FIG. 8 becomes substantially constant irrespective of the position in the width direction of each ring 17 as shown by a characteristic line represented by solid lines. Therefore, the centering performance of each ring 17 improves.

Furthermore, since the grooves 27 are provided on the inner peripheral surfaces of the thin sheets 26 constituting each ring 17, lubrication oil is discharged (thrown off) from the contact surfaces of the elements 18 and the rings 17 to the outside along the grooves 27. In the first embodiment, the density of the grooves 27 in the regions D1 is higher than the density of the grooves 27 in the regions C1. Therefore, due to the same principles of the discharge of lubrication oil through the grooves 25, the centering characteristic of the rings 17 improves.

Next, the amount of lubrication oil supplied to gaps between the thin sheets 26 constituting each ring 17. With regard to the gaps between the thin sheets 26, large amounts of lubrication oil are supplied to the entrance of each ring-receiving portion 23, a less amount of lubrication oil is supplied to the interior depth side of each ring-receiving portion 23. A reason for this is as the same as stated above. That is, the amount of lubrication oil supplied to the regions D1 apart from the neck portion 20 is larger than the amount of lubrication oil supplied to the regions C1 near the neck portion 20. A case (comparative example) in which the grooves 27 are not provided will be described. In such a case, the friction coefficient on the contact surfaces of the thin sheets 26 has a tendency as shown by the dashed line in FIG. 4. Specifically, the friction coefficient shows a characteristic of demising with the increasing distance from the neck portion 20 side toward the driving pulley 5 or the driven pulley 6. Then, the friction force on the contact surfaces of the thin sheets 26 have a tendency shown by a dashed line in FIG. 5. Specifically, the friction force has a characteristic of declining with the increasing distance from the neck portion 20 side toward the driving pulley 5 or the driven pulley 6. This results in a state in which a line of the center of an inwardly located thin sheet 26 in the width direction and a line of the center of an outwardly located thin sheet 26 in the width direction are tilted with each other. That is, there is a possibility of decline in the centering performance of each ring 17 within each ring-receiving portion 23.

In the first embodiment, however, lubrication oil is discharged (thrown off) from the contact surfaces of the thin sheets 26 to the outside along the grooves 25. This is because the kinetic energy of the lubrication oil is less than the kinetic energy of the belt 16. Besides, in the first embodiment, the density of the grooves 27 in the regions D1 is higher than the density of the grooves 27 in the regions C1. Therefore, although the amount of lubrication oil supplied to the regions D1 is larger than the amount of lubrication oil supplied to the regions C1, the lubrication oil amount discharged from the region D1 to the outside along the grooves 27 is larger than the lubrication oil amount discharged from the regions C1 to the outside along the grooves 27. Therefore, the lubrication oil amount present in the regions C1 and the lubrication oil amount present in the regions D1 are substantially equal. Hence, the friction coefficient shown in FIG. 4 becomes substantially constant irrespective of the position in the width direction of the thin sheets 26 as shown by the characteristic line represented by the solid line. Furthermore, the friction force shown in the FIG. 5 becomes substantially constant irrespective of the position in the width direction of the thin sheets 26 as shown by the characteristic line represented by the solid line. The tension of the thin sheets 26 shown in FIG. 6 becomes substantially constant irrespective of the position in the width direction of the thin sheets 26 as shown by the characteristic line represented by the solid line. The circumferential length of the thin sheets 26 becomes substantially constant irrespective of the position in the width direction of the thin sheets 26 as shown by the characteristic line represented by a solid line. When the friction force in the width direction of the ring 17 becomes substantially constant, the tension of the ring 17 is substantially constant and variation of the stress in the ring 17 is minimized. Then, the durability of the ring 17 is improved.

Due to the aforementioned operations and characteristic combined, the movement force of the thin sheets 26 as shown in FIG. 8 becomes substantially constant irrespective of the position in the width direction of the thin sheets 26 as shown by the characteristic line represented by solid lines. Therefore, the centering performance of the thin sheets 26 improves. Incidentally, although in the first embodiment, the grooves 25 and the grooves 27 are both provided, it is permissible to provide only the grooves 25 or only the grooves 27. It is to be noted herein that the thin sheets 26 correspond to component pieces in the invention, and the grooves 25, 27 correspond to a lubrication oil discharge mechanism in the invention, and the grooves 27 correspond to a first groove, and the grooves 25 correspond to a second groove.

Figure 9:
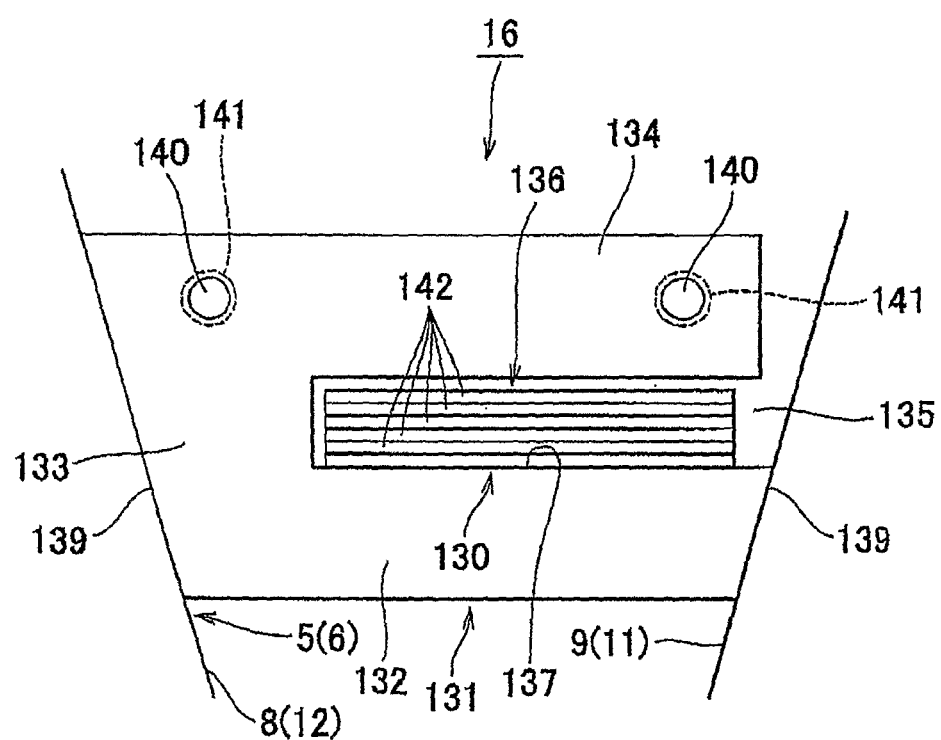
FIG. 9 is a vertical sectional view of a continuously variable transmission belt in the width direction corresponding to a second embodiment of the invention.
Figure 10:
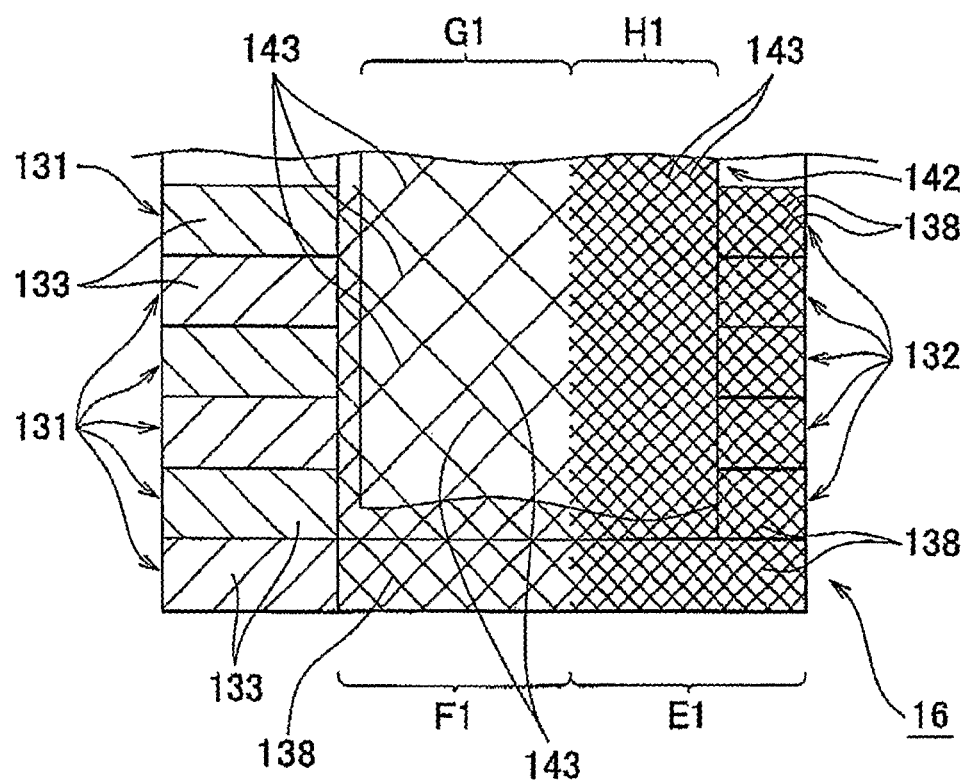
FIG. 10 is a partial plan sectional view of the continuously variable transmission belt corresponding to the second embodiment of the invention, viewed from the outer periphery side.

Another construction example of the belt 16 will be described in conjunction with a second embodiment, with reference to FIGS. 9 and 10. FIG. 9 is a vertical sectional view (front vertical sectional view) of a belt 16 taken in the thickness direction thereof. FIG. 10 is a partial plan sectional view of the belt 16, viewed from the outer periphery side. In the second embodiment, the belt 16 has an annular ring 130, and many elements 131 attached to the ring 130 side by side in the circumferential direction of the ring 130. The elements 131 will be firstly described. Each element 131 is formed through a press process of a metal material. The elements 131 are superimposed in the thickness direction thereof. Each element 131 has an inward-side portion 132 extending in the width direction of the belt 16, a neck portion 133 provided continuously from an end of the inward-side portion 132 in the width direction and protruded therefrom toward an outer periphery side in the thickness direction of the belt 16, and a holder portion 134 extending from the neck portion 133 in the width direction of the belt 16. The inward-side portion 132 and the holder portion 134 extend substantially parallel to each other. An opening portion 135 is provided between a distal end of the inward-side portion 132 and a distal end of the holder portion 134, and a ring-receiving portion 136 is provided between the inward-side portion 132 and the holder portion 134. The ring-receiving portion 136 is a space or a recess. The ring-receiving portion 136 is continuous to the opening portion 135.

An upper end surface 137 of the inward-side portion 132 of each element 131 is also a bottom surface of the ring-receiving portion 136. The upper end surface 137 is provided with a lubrication oil discharge mechanism. The lubrication oil discharge mechanism is a mechanism that discharges lubrication oil from between the inner peripheral surface of the ring 130 and the inward-side portion 132 of the element 131. In the second embodiment, grooves 138 are provided as the mechanism. The grooves 138 are recesses or dents having a depth in the thickness direction of the belt 16, and also are in a checkered pattern formed by intersecting linear grooves 138 with each other in FIG. 10. Besides, as shown in FIG. 10, the density of the grooves 138 is different between a region E1 and a region F1 that are provided at different positions in the width direction of the belt 16. The region E1 is a region that is near the opening portion 135 of the ring-receiving portion 136 in the width direction of the belt 16. The region F1 is a region corresponding to a region between the neck portion 133 and the region E1 in the width direction of the belt 16. Then, in each upper end surface 137, the density of the grooves 138 provided in the region E1 is higher than the density of the grooves 138 provided in the region F1. Specifically, while the regions E1, F1 are both provided with plural grooves 138 being parallel to each other and intersecting with each other, the intervals between the grooves 138 provided in the region F1 are shorter than the intervals between the grooves 138 provided in the region F1. In other words, the density of the grooves 138 per unit area in the region E1 is higher than the density of the grooves 138 per unit area in the region F1. That is, the area of the grooves 138 per unit area in the region E1 is larger than the area of the grooves 138 per unit area in the region E1.

Both ends of the element 131 in the width direction of the belt 16 have contact surfaces 139. Each of the two contact surfaces 139 of each element 131 is titled with respect to a line of the center (not shown) of the element 139 in the width direction of the belt 16 so that the distance between the two contact surfaces 22 in the width direction of the belt 16 becomes shorter toward an inner periphery side of the belt 16, The belt 16 is wrapped around the driving pulley 5 and the driven pulley 6, and the contact surfaces 139 of the elements 131 contact the driving pulley 5 and the driven pulley 6 as shown in FIG. 9. One of two opposite surfaces of the holder portion 134 is provided with two protruded pins 140, and the other surface thereof is provided with two recesses 141. The one and the other of two opposite surfaces of the holder portion 134 mean surfaces thereof in the thickness direction of each element 131. When the elements 131 are superimposed on one another in the thickness direction, the pins 140 of the elements 131 are disposed in the recesses 141 of the adjacent elements 131, whereby the elements 131 disposed at adjacent positions are defined in position relative to each other, concretely, defined in position relative to each other on a plane orthogonal to the stacking direction of the elements 131.

Next, a construction of the single ring 130 disposed in the ring-receiving portion 136 will be described. The ring 130 is constructed by layering a plurality of metal-made annular thin sheets 142 on each other's inner and outer peripheries, that is, in the inner-to-outer periphery direction. That is, the thin sheets 142 are superimposed on one another in the thickness direction to construct a ring 130. Besides, the thin sheets 142 in the superimposed state are slidable relative to one another in the circumferential direction. Besides, the thin sheets 142 have the same width in the width direction of the belt 16. In the width direction of the belt 16, the width of the ring 130 is narrower than the width of the ring-receiving portion 136. Therefore, when the ring 130 is disposed in the ring-receiving portion 136 of each element 131, that is, when the elements 131 are attached to the ring 130 to assemble the belt 16, and the belt 16 is wrapped around the driving pulley 5 and the driven pulley 6, the inward-side portion 132 contacts the inner peripheral surface of the ring 130, so as to prevent the elements 131 from falling apart from the ring 130.

At least one of an inner peripheral surface and an outer peripheral surface of each of thin sheets 142 that constitute the ring 130 is provided with grooves 143 as a lubrication oil discharge mechanism as shown in FIG. 10. The grooves 143 are recesses or dents having a depth in the thickness direction of each thin sheet 142. In FIG. 10, the grooves 143 are provided on the outer peripheral surface of each thin sheet 142 as an example construction. Concretely, a checkered pattern is formed by intersecting linear grooves 143 with each other.

Besides, as shown in FIG. 10, the density of the grooves 143 is different between a region GI and a region H1 that are disposed at different positions on each thin sheet 143 in the width direction of the belt 16. It is to be noted herein that the region G1 is a region closer to the neck portion 133 in the width direction of the belt 16. Besides, the region H1 is closer to the opening portion 135 than the region G1 is. That is, in the width direction of the belt 16, the region H1 occupies a position that is more apart from the neck portion 133 than the region G1 is from the neck portion 133. Then, the density of the grooves 143 provided in the region H1 is higher than the density of the grooves 143 provided in the region G1. Specifically, while the regions G1, H1 are both provided with plural grooves 143 parallel to each other, the intervals between the grooves 143 provided in the region H1 are shorter than the intervals between the grooves 143 provided in the region G1. In other words, the density of the grooves 143 per unit area in the region H1 is higher than the density of the grooves 143 per unit area in the region G1. That is, the area of the grooves 143 per unit area in the region H1 is designed to be larger than the area of the grooves 143 per unit area in region G1.

In the belt 16 in the second embodiment, as in the first embodiment, the torque of the driving pulley 5 is converted into compression force between the elements 131, and the compression force is transmitted to the driven pulley 6, so that torque in such a direction as to rotate the driven pulley 6 is generated. When torque is being transmitted, elements 131 disposed at adjacent positions rotate relative to each other in a certain angle range, with a rocking edge (not shown) being a fulcrum, so that each element 131 and the inner peripheral surface of the ring 130 slide on each other. Besides, the ring 130 is constructed of superimposing annular thin sheets 142 on one another, and the thin sheets 142 slid on each other due to the same principle as in the first embodiment. In the second embodiment, too, the elements 131 slide along the inclined surfaces of the driving pulley 5 and the driven pulley 6, by substantially the same principle as in the first embodiment. Then, in the second embodiment, similarly to the first embodiment, the belt 16 is supplied with lubrication oil, so that the cooling and lubrication of sliding portions of the belt 16 is performed.

In the second embodiment, when the belt 16 shown in FIG. 9 is supplied with lubrication oil from above, the lubrication oil passes through the opening portion 135 of each element 131, and is supplied into the ring-receiving portion 136 thereof. The amount of lubrication oil supplied in the ring-receiving portion 136 varies in the width direction of the ring 130. Concretely, a large amount of lubrication oil is supplied to a vicinity of the opening portion 135, whereas a less amount of lubrication oil is supplied to the neck portion 133. A reason for this is that since the lubrication oil supply path (gap) to the neck portion 133 of each element 131 is narrow, the flow resistance of lubrication oil is strong, and also since the distance of the path is long, the kinetic energy of lubrication oil declines along the path. In the second embodiment, however, the density of the grooves 138 is higher in the region E1 than in the region F1. That is, the lubrication oil discharging function is higher in the region E1 than in the region F1. As a result, the friction coefficients and the friction forces on the contact surfaces between the upper end surface 137 of each element 131 and the inner peripheral surface of the ring 130 become substantially equalized or uniform in the width direction of the ring 130. Therefore, the centering performance of the ring 130 improves. Furthermore, when the friction force in the width direction of the ring 130 becomes substantially constant, the tension of the ring 130 is substantially constant and variation of the stress in the ring 130 is minimized. Then, the durability of the ring 130 is improved.

Next, the amount of lubrication oil supplied to gaps between the thin sheets 142 constituting the ring 130. In each of the gas between the thin sheets 142, the amount of lubrication oil supplied varies in the width direction of the ring 130 for substantially the same reason as described above. That is, the amount of lubrication oil supplied to the region H1 apart from the neck portion 133 is larger than the amount of lubrication oil supplied to the region G1 closer to the neck portion 133. In the second embodiment, however, lubrication oil is discharged (thrown oft) from the contact surfaces of the thin sheets 142 along the grooves 143. The lubrication oil present in the region G1 is discharged after passing through the region H1. Besides, the lubrication oil in the region H1 is discharged without any special process. The lubrication oil discharged into the ring-receiving portions 136 of the elements 131 is discharged into an external space through the gaps between the elements 131. The density of the grooves 143 in the region H1 is higher than the density of the grooves 143 in the region G1. That is, the lubrication oil discharging function in the region H1 is higher than the lubrication oil discharging function in the region G1. Therefore, the lubrication oil amount present in the region H1 and the lubrication oil amount present in the region G1 become substantially equalized, and the friction coefficient and the friction force on the contact surfaces of the thin sheets 142 become substantially equalized in the width direction of the ring 130. Therefore, the centering performance of the thin sheet 142 improves. In addition, although in the second embodiment, the grooves 138 and the grooves 143 are both provided, it is permissible to provide only the grooves 138 or only the grooves 148. It is to be noted herein that the thin sheet 142 corresponds to a component piece in the invention, and the grooves 138, 143 correspond to a lubrication oil discharge mechanism in the invention, and the grooves 143 correspond to a first groove, and the grooves 138 correspond to a second groove.

Figure 11:
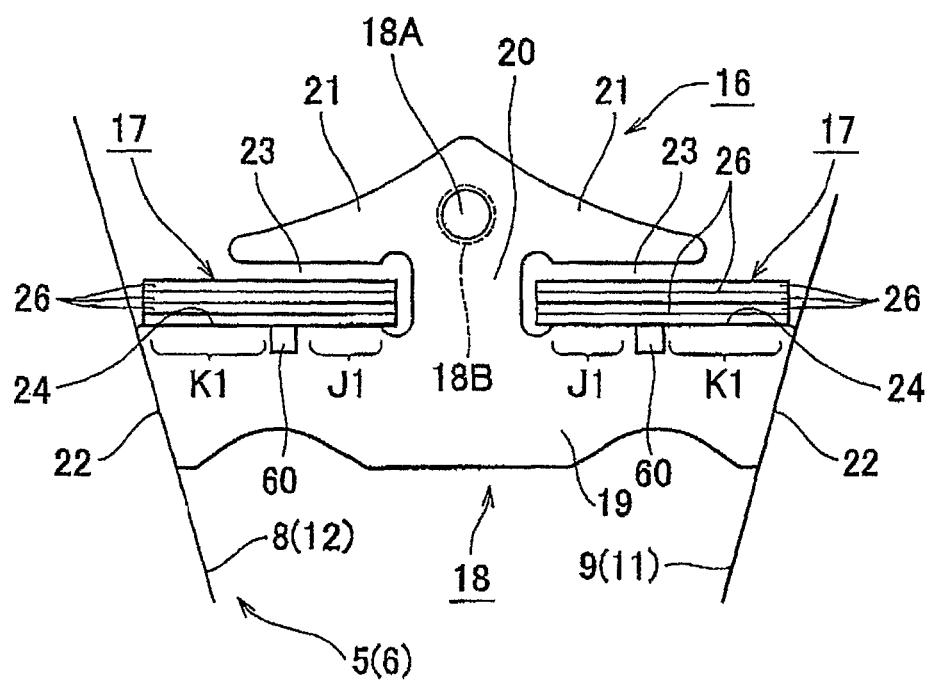
FIG. 11 is a vertical sectional view of a continuously variable transmission belt in the width direction corresponding to a third embodiment of the invention.

Next, the belt 16 will be further described in conjunction with a third embodiment with reference to FIG. 11. The third embodiment corresponds to claims 5 and 6. FIG. 11 is a vertical sectional view (front sectional view) of a belt 16 in the thickness direction. In the illustration of the third embodiment, the same constructions as those described in conjunction with the first embodiment will be assigned with the same reference characters as in the first embodiment. In the third embodiment, the grooves 25 and the grooves 27 described in conjunction with the first embodiment are both discarded. In the third embodiment, two upper end surfaces 24 of each element 18 are provided with grooves 60 that extend in the circumferential direction of the belt 16. Each upper end surface 24 is partitioned in the width direction of the ring 17 into a region 31 and a region K1 by the groove 60. The region J1 is near the neck portion 20, and the region K1 is apart from the neck portion 20. In a plane where the belt 6 is viewed from the outer periphery side, the area of the region J1 is smaller than the area of the region K1. Concretely, the effective area of the region J1 that contacts the inner peripheral surface of each ring 17 is smaller than the effective area of the region K1 that contacts the inner peripheral surface of each ring 17.

Operation of the third embodiment will be described. Similarly to the first embodiment, lubrication oil enters a gap between the ring 17 and the upper end surface 24. Concretely, the region K1 is supplied with lubrication oil. Since the groove 60 are provided, the lubrication oil is discharged via the grooves 60. That is, the region J1 is not supplied with lubricant oil, or is supplied with a reduced amount of lubricant oil. Therefore, the friction coefficient in the region K1 becomes smaller than the friction coefficient in the region J1. In contrast, the area of the region J1 is smaller than the area of the region K1. Then, the friction force found from the friction coefficient, the area, etc. becomes substantially constant at different positions in the width direction of the ring 17, that is, between the region 11 and the region K1, so that the decline in the centering performance of the ring 17 can be restrained. Furthermore, when the friction force in the width direction of the ring 17 becomes substantially constant, the tension of the ring 17 is substantially constant and variation of the stress in the ring 17 is minimized. Then, the durability of the ring 17 is improved. It is to be noted herein that the grooves 60 and the regions K1, J1 constructed in accordance with the foregoing area relationship correspond to a friction force equalization mechanism, and the grooves 60 correspond to a partition groove, and the region J1 corresponds to a first region in the invention, and the region K1 corresponds to a second region in the invention.

Figure 12:
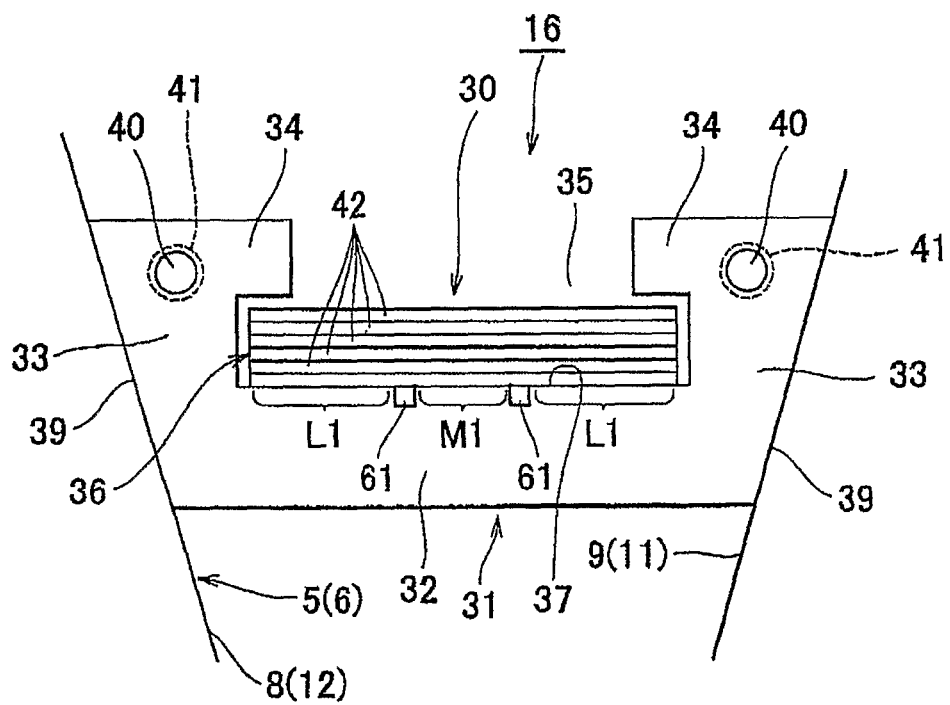
FIG. 12 is a vertical sectional view of a continuously variable transmission belt in the width direction corresponding to a fourth embodiment of the invention.

Next, a fourth embodiment of the belt 16 will be described with reference to FIG. 12. FIG. 12 is a sectional view of a belt 16 in its thickness direction. In the fourth embodiment, the belt 16 has an annular ring 30, and many elements 31 attached to the ring 30 side by side in the circumferential direction of the ring 30. The elements 31 will be firstly described. The elements 31 are formed through a press process of a metal material. The elements 31 are superimposed on each other in the thickness direction thereof. Each element 31 has a base portion 32 that is extended in the width direction of the belt 16, and two neck portions 33 that are continuous from two opposite ends of the base portion 32 in the thickness direction thereof and that are protruded to an outer periphery side in the thickness direction of the belt 16. Thus, two neck portions 33 are provided on the two opposite ends of each element 31 in the width direction of the belt 16. Each neck portion 33 is provided with a holder portion 34 protruded toward the other neck portion 33. In this manner, an opening portion 35 is provided between the holder portions 34, and a ring-receiving portion 36 is provided, surrounded by the two holder portions 34, the two neck portions 33 and the base portion 32. The ring-receiving portion 36 is a space or a recess. The ring-receiving portion 36 is continuous with the opening portion 35. In the width direction of the belt 16, the width of the ring-receiving portion 36 is larger than the opening width of the opening portion 35. The ring 30 is disposed in the ring-receiving portion 36.

An upper end surface 37 of the base portion 32 of each element 31 is also a bottom surface of the ring-receiving portion 36. The upper end surface 37 is provided with two grooves 61 extending along the circumferential direction of the belt 16. The grooves 61 are provided at different positions in the width direction of the belt 16. Thus, the upper end surface 37 is partitioned into two regions L1 and one region M1 in the width direction of the ring 30. It is to be noted herein that the two regions L1 are near the neck portion 33, and the region M1 is disposed between the regions L1 and is apart from the neck portion 33. The area of the region M1 is smaller than the area of either one of the region L1. More specifically, in terms of the effective area that contacts the inner peripheral surface of the ring 30, the region Ml is smaller than the area of either one of the regions L1.

Operation of the fourth embodiment will be described. Lubrication oil enters a gap between the upper end surface 37 and the ring 30 via the opening portion 35. Concretely, lubrication oil is supplied to the regions L1, and is discharged along the grooves 61. That is, the region M1 is not supplied with lubrication oil, or is supplied with only a reduced amount of lubrication oil. Therefore, the friction coefficient of the region M1 is greater than the friction coefficient of either one of the regions L1. The area of the region M1 is smaller than the area of the region L1. Then, the friction force found from the friction coefficient, the area, etc. becomes substantially equal in the width direction of the ring 30, and restrains the decline in the centering performance of the ring 30. Furthermore, when the friction force in the width direction of the ring 30 becomes substantially constant, the tension of the ring 30 is substantially constant and variation of the stress in the ring 30 is minimized. Then, the durability of the ring 30 is improved. Incidentally, the grooves 61 correspond to a friction force equalization mechanism and to a partition groove. The region M1 corresponds to an inner-side region in the invention, and the regions L1 correspond to an outer-side region in the invention.

Figure 13:
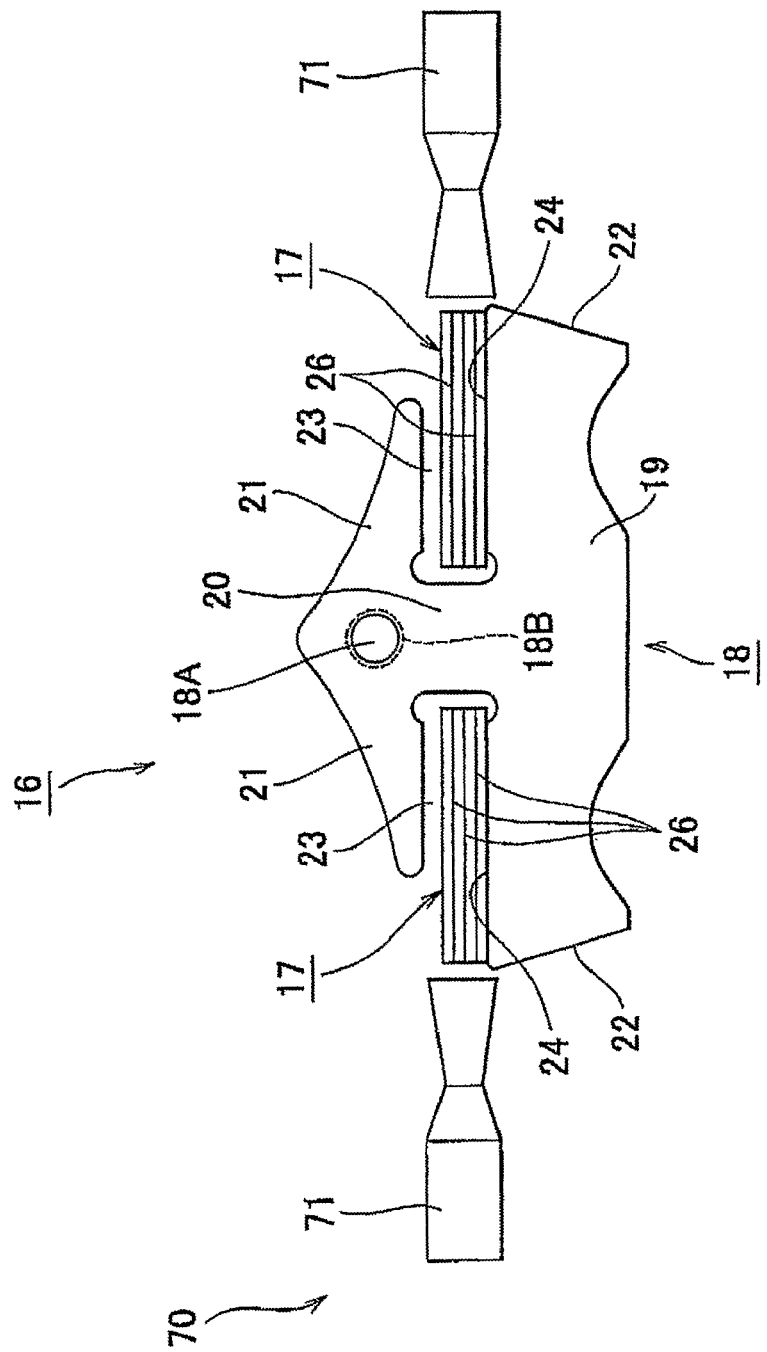
FIG. 13 is a vertical sectional view of a continuously variable transmission belt in the width direction corresponding to a fifth embodiment of the invention.
Figure 14:
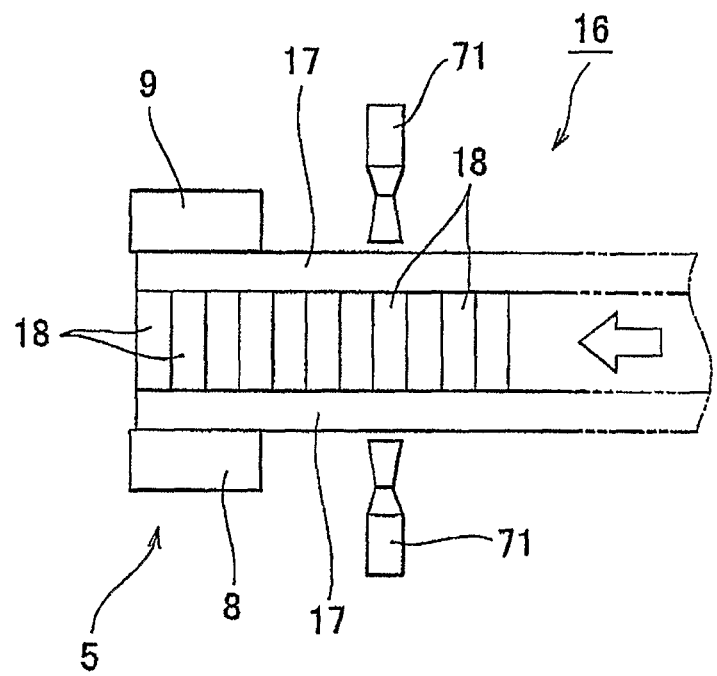
FIG. 14 is a partial plan view of the continuously variable transmission belt corresponding to the fifth embodiment of the invention, viewed from the outer periphery side.
Figure 15:
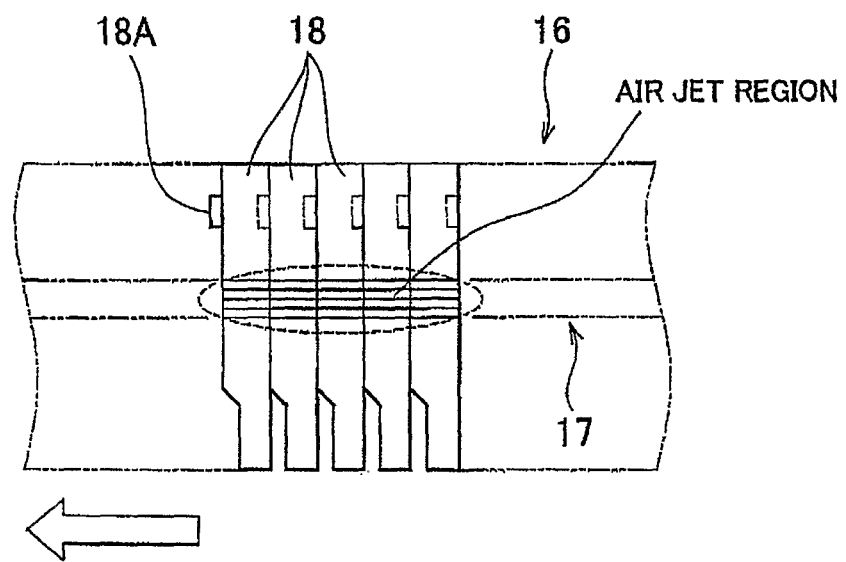
FIG. 15 is a partial side view of the continuously variable transmission belt in the thickness direction corresponding to the fifth embodiment of the invention.

Next, a fifth embodiment in conjunction with the belt type continuously variable transmission 1 will be described with reference to FIGS. 2, 13, 14 and 15. FIG. 13 is a vertical sectional view (front vertical sectional view) of the belt 16 in the thickness direction. FIG. 14 is a partial plan view of the belt 16 viewed from an outer periphery side. FIG. 15 is a partial side view of the belt 16. In the fifth embodiment, the belt 16 has two ring-receiving portions 23; and two rings 17 disposed in the ring-receiving portions 23, similar to the belts described above in conjunction with the first embodiment and the third embodiment. An air blowing mechanism 70 is provided between a driving pulley 5 and a driven pulley 6. The air blowing mechanism 70 is a device that blows air to the belt 16 so as to generate a force that pushes the lubrication oil located between thin sheets 26 constituting the rings 17, or the lubrication oil located between the rings 17 and the elements 18, to a region (location or site) that is as near to the neck portion 20 as possible. The air blowing mechanism 70 has an air compressor (not shown), an angle adjustment mechanism, a valve (not shown), air jet nozzles 71, etc. Each air jet nozzle 71 is disposed on the movement path of the belt 16 between the lubrication supply position of a lubrication oil supply mechanism 50 and the position at which the belt 16 winds on the driving pulley 5. The air jet nozzles 71 are disposed on both sides across the movement path of the belt 16. A distal end of each air jet nozzle 71 is directed toward an adjacent one of the rings 17 of the belt 16. Besides, in the thickness direction of the belt 16, the distal ends of the air jet nozzles 71 are disposed at the same position (height) as the ring-receiving portions 23 and the rings 17, as shown in FIGS. 13 and 15.

The air blowing mechanism 70 is constructed so as to be controlled by the electronic control device 100 and be adjustable in the air jet timing, the jet pressure, the jet amount, the jet speed, the jet angle (direction), etc. The angle adjustment mechanism has an actuator, for example, a step motor. The jet angle means an angle formed between a line of the center in the width direction of the belt and an air jet center line, and an angle formed between a line of the center in the thickness direction of the rings and the air jet center line. The valve is constructed of, for example, a solenoid valve. By adjusting the electrification current, the electrification timing, the degree of opening, etc., the valve can be controlled in the timing of air jet from the air jet nozzles 71, the jet amount, the jet pressure, the jet speed, etc.

As described above, lubrication oil is supplied from the lubrication oil supply mechanism 50 to the belt 16. In the belt 16 constructed as shown in FIG. 13, each element 18 is provided with the ring-receiving portions 23 that each have an interior depth in the width direction of the belt 16, and the rings 17 are disposed in the ring-receiving portions 23. Therefore, the amount of lubrication oil is large in the vicinity of an entrance of each ring-receiving portion 23, and the flow resistance of lubrication oil is high and therefore the amount of lubrication oil is less in the vicinity of an interior depth side of each ring-receiving portion 23. In the fifth embodiment, however, when air is injected from the air jet nozzles 71, the lubrication oil in the vicinity of the entrance of each ring-receiving portion 23 is pushed by the air jet pressure toward the interior depth side of the ring-receiving portion 23. Therefore, in the width direction of the rings 17, the amount of lubrication oil present between the upper end surfaces 24 of each element 18 and the inner peripheral surfaces of the rings 17 and the amount of lubrication oil present between the thin sheets 26 constituting the rings 17 become substantially equalized or uniform. Therefore, substantially the same effects as in the first embodiment can be attained.

Incidentally, the belt 16 applied in the fifth embodiment may also be a belt that is not provided with any of the grooves 25, 27, 60, or may also be a belt that is provided with at least one of the grooves 25, 27, 60. Besides, the position at which the air jet nozzles 71 is disposed may be in a region in which compression load occurs between the elements 16. That is, it suffices that the air jet nozzles 71 are able to inject air toward the belt 16 after lubrication oil has been supplied to the belt 16. Specifically, the air jet nozzles 71 are disposed in a region where the belt 16 is not wrapped around either one of the driving pulley 5 and the driven pulley 6.

The invention claimed is:

1. A continuously variable transmission belt, comprising:
a ring including superimposed annular component pieces;
a plurality of elements that are stacked in a circumferential direction of the ring and attached to the ring, each of the plurality of elements including
a base portion extending in a width direction of the ring,
a neck portion extending from the base portion in a radius direction of the ring, and
a ring-receiving portion that receives the ring, the ring being disposed in the ring-receiving portion;
a plurality of first grooves and a plurality of second grooves; and
a lubrication oil discharge mechanism that discharges out a lubrication oil that is in a gap between the ring and the plurality of elements to an outside of the ring-receiving portion, the lubrication oil discharging mechanism being disposed at an upper end surface of each of the plurality of elements in the ring receiving portion,
wherein an amount of the lubrication oil discharged from a region that is remote from the neck portion in a width direction of the ring is greater than an amount of the lubrication oil discharged from a region that is near the neck portion in the width direction of the ring,
wherein the lubrication oil discharge mechanism includes a second groove provided on each of an inner periphery and an outer periphery of the annular component pieces, and a first groove provided on each of the elements,
wherein, in a plane on the ring viewed from an outer periphery side or an inner periphery side, a first area of the first groove present in the region that is remote from the neck portion in the width direction of the ring is larger than a second area of the first groove present in the region that is near the neck portion in the width direction of the ring,
wherein, in the plane on the ring viewed from the outer periphery side or the inner periphery side, a first area of the second groove present in the region that is remote from the neck portion in the width direction of the ring is larger than a second area of the second groove present in the region that is near the neck portion in the width direction of the ring,
wherein the plurality of first grooves and the plurality of second grooves are disposed, respectively, in a checkered pattern, such that each first groove of the plurality of first grooves intersects another first groove of the plurality of first grooves, and each second groove of the plurality of second grooves intersects another second groove of the plurality of second grooves,
wherein a density of the plurality of first grooves in the first area of the first groove present in the region that is remote from the neck portion in the width direction of the ring is greater than a density of the plurality of first grooves in the second area of the first groove present in the region that is near the neck portion in the width direction of the ring, and
wherein a density of the plurality of second grooves in the first area of the second groove present in the region that is remote from the neck portion in the width direction of the ring is greater than a density of the plurality of second grooves in the second area of the second groove present in the region that is near the neck portion in the width direction of the ring.

\* \* \* \* \*